United States Patent
Hasz

[15] 3,692,370
[45] Sept. 19, 1972

[54] DAMPING MEANS FOR INCREASING THE MINIMUM DYNAMIC STIFFNESS OF A SHAFT

[72] Inventor: John R. Hasz, 5686 Sherwood Drive, Milford, Ohio 45150

[22] Filed: Sept. 23, 1971

[21] Appl. No.: 183,035

Related U.S. Application Data

[62] Division of Ser. No. 857,155, Sept. 11, 1969, Pat. No. 3,664,228.

[52] U.S. Cl............................308/1, 51/169, 64/1 V, 74/574, 188/1 B
[51] Int. Cl............................B24b 45/00, F16f 15/00
[58] Field of Search........51/168, 169, 166 R, 166 TS; 74/574; 64/1 V; 308/1, 73; 188/1 B; 90/11 A, 11 R; 77/58 B; 82/DIG. 9

[56] References Cited

UNITED STATES PATENTS

| | | | |
|---|---|---|---|
| 1,478,797 | 12/1923 | Ray | 51/169 X |
| 1,697,046 | 1/1929 | Chapman | 51/166 TS |
| 2,001,167 | 5/1935 | Swennes | 64/1 V |
| 2,582,873 | 1/1952 | Larson | 51/166 TS |
| 2,747,440 | 5/1956 | Kyser | 77/58 B |
| 3,292,237 | 12/1966 | Fisher | 77/58 B |
| 3,385,009 | 5/1968 | Lueders | 51/168 |
| 3,463,048 | 8/1969 | Owsen | 90/11 A |

Primary Examiner—Donald G. Kelly
Attorney—Frank C. Leach, Jr.

[57] ABSTRACT

The minimum dynamic stiffness of a spindle of a grinding wheel is increased by having a sleeve of viscoelastic material bonded to the spindle between the bearing supports for the spindle. A sleeve surrounds the viscoelastic material sleeve to constrain the sleeve of viscoelastic material to increase its shear strains and is bonded thereto.

12 Claims, 6 Drawing Figures

3,692,370
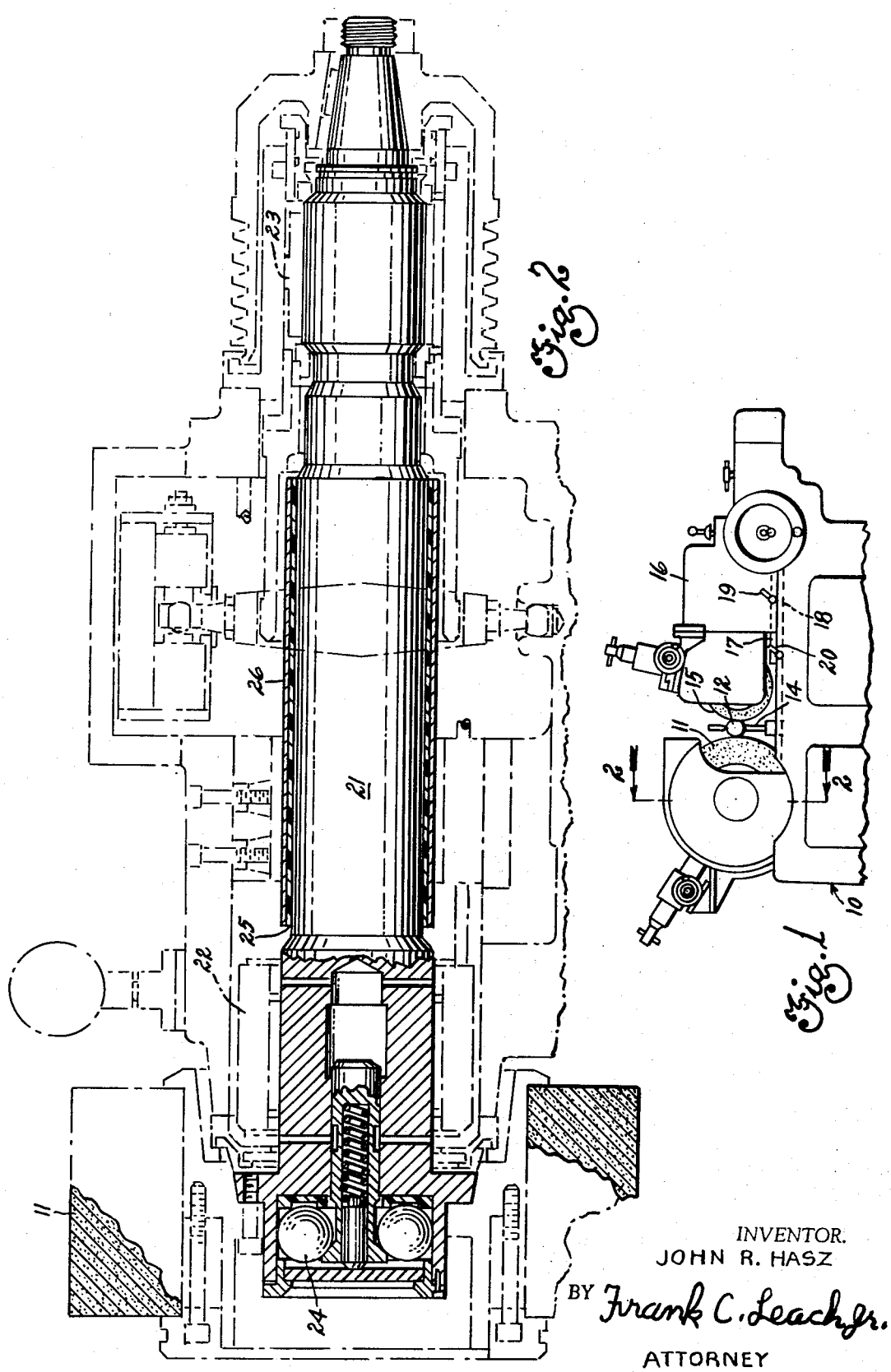
INVENTOR.
JOHN R. HASZ
BY Frank C. Leach Jr.
ATTORNEY

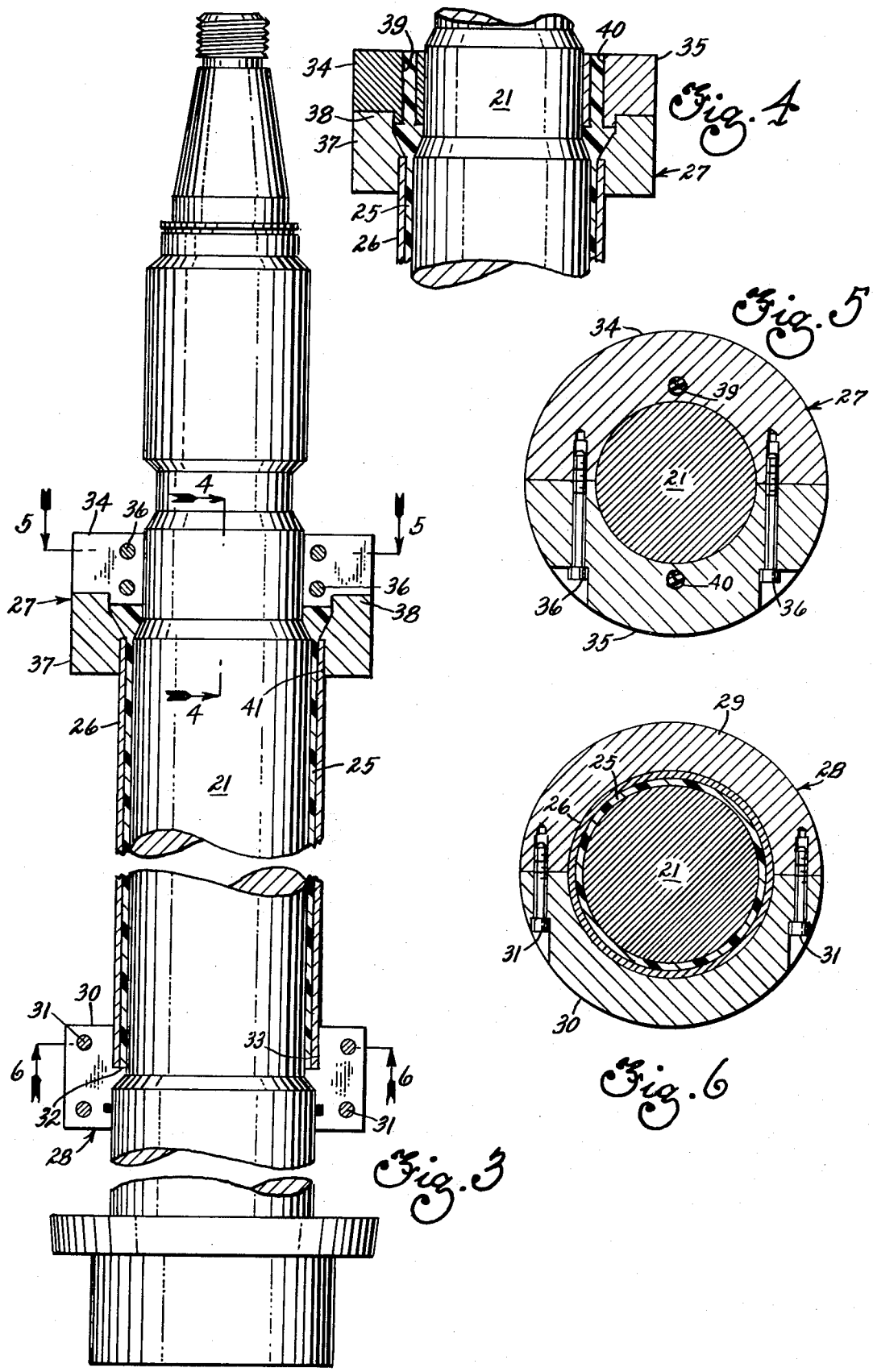

DAMPING MEANS FOR INCREASING THE MINIMUM DYNAMIC STIFFNESS OF A SHAFT

This application is a division of application Ser. No. 857,155, filed Sept. 11, 1969, now U.S. Pat. No. 3,664,228, issued May 23, 1972.

In machine tools such as a grinding machine, for example, the displacement of the grinding wheel due to the force created by engagement with the workpiece being ground creates a bending of the grinding wheel spindle between its support bearings. This bending of the spindle between its support bearings introduces a vibration in the spindle that is transmitted to the grinding wheel to produce regenerative chatter when the ratio of the cutting stiffness, which is the spring constant between the cutting element and the material, to the minimum dynamic stiffness of the spindle exceeds one-half. The cutting stiffness may be lowered by decreasing the feedrate of the grinding wheel into the workpiece, reducing the width of the grinding wheel, dressing the grinding wheel more often, or increasing the surface speed of the grinding wheel.

Therefore, to insure that regenerative chatter does not occur, the cutting parameters of the grinding machine must be selected so that the ratio of the cutting stiffness to the minimum dynamic stiffness is equal to or less than one-half; this is known as the borderline of stability. Accordingly, this necessitates the grinding operation to be performed at less than optimum conditions. Thus, an increased period of time is required to grind a workpiece over that required if the minimum dynamic stiffness of the spindle were maximized so that grinding could occur more quickly without regenerative chatter occurring.

Since it is necessary for the ratio of the cutting stiffness to the minimum dynamic stiffness of the spindle to be equal to or less than one-half to insure that regenerative chatter does not occur, an increase in the minimum dynamic stiffness of the spindle will allow the cutting stiffness to be increased without the ratio of the cutting stiffness to the dynamic stiffness exceeding one-half whereby regenerative chatter could occur. Thus, by increasing the minimum dynamic stiffness of the spindle, one or more of the grinding parameters can be changed to lower the time period for grinding without regenerative chatter occurring. That is, the feedrate of the grinding wheel workpiece can be increased, the speed of rotation of the grinding wheel can be decreased, the width of the grinding wheel can be increased, and the grinding wheel may be dressed at longer intervals. Any of the foregoing will decrease the period required for grinding a particular part so that the unit cost for grinding workpieces can be substantially reduced when the minimum dynamic stiffness of the spindle is increased.

The present invention satisfactorily solves the foregoing problem by utilizing damping means to increase the minimum dynamic stiffness of the spindle, preferably to a maximum. As a result, the cutting stiffness can be increased, and the ratio of the cutting stiffness to the minimum dynamic stiffness of the spindle still maintained equal to or less than one-half. Accordingly, by utilizing the damping means of the present invention to increase the minimum dynamic stiffness of the spindle, the unit cost for grinding workpieces is substantially reduced in comparison with the unit cost for grinding workpieces on the same grinding machine without the damping means of the present invention.

The present invention utilizes a viscoelastic material to increase the minimum dynamic stiffness of the spindle. The present invention does not require any tuning of the damping means as is required when tuned damped vibration absorbers are used. It is only necessary to dispose the viscoelastic material so that it absorbs the vibrations of the spindle. The viscoelastic material absorbs energy from compression, tension, and shear strains created therein by the bending of the spindle between its bearing supports. Thus, the viscoelastic material of the present invention is an energy dissipator.

An object of this invention is to provide damping means to increase the minimum dynamic stiffness of a shaft.

Other objects of this invention will be readily perceived from the following description, claims, and drawings.

This invention relates to the combination of a rotating shaft having longitudinally spaced portions supported by bearing means. Damping means is disposed between the bearing means to increase the minimum dynamic stiffness of the rotating shaft with the damping means disposed in at least partial surrounding relation to the rotating shaft to be movable in response to vibrations of the rotating shaft to absorb the vibrations. The damping means is mounted on the rotating shaft so as to not be slidable relative thereto.

The attached drawings illustrate a preferred embodiment of the invention, in which:

FIG. 1 is a front elevational view of a centerless grinding machine in which the damping means of the present invention may be employed;

FIG. 2 is a longitudinal sectional view of the spindle of the grinding wheel having the damping means thereon with various other elements of the grinding machine shown in phantom and taken along line 2—2 of FIG. 1;

FIG. 3 is a longitudinal sectional view illustrating an apparatus for forming the damping means of the present invention on a spindle;

FIG. 4 is a longitudinal sectional view of a portion of the spindle and one of the fixtures for supporting the spindle during formation of the damping means on the spindle and taken along line 4—4 of FIG. 3;

FIG. 5 is a cross sectional view of the fixture of FIG. 4 and taken along line 5—5 of FIG. 3; and FIG. 6 is a cross sectional view of the other of the fixtures for supporting the spindle during formation of the damping means on the spindle and taken along line 6-6 of FIG. 3.

Referring to the drawings and particularly FIG. 1, there is shown a centerless grinding machine having a base 10 on which is supported a grinding wheel 11 for rotation about an axis, which is fixed with respect to the base 10. A workpiece 12, which is to be ground by the grinding wheel 11, is supported on a work rest blade 14.

The workpiece 12 is pressed against the grinding wheel 11 by a regulating wheel 15. The regulating wheel 15 rotates at a reduced speed and serves to regulate or control the rotation of the workpiece 12 as it is being ground by the grinding wheel 11.

The regulating wheel 15 is carried by a wheelhead 16, which is guided by ways 17 on a lower slide 18. The lower slide 18 is slidably guided for sliding movement on the base 10 and carries the work rest blade 14 at its forward end.

A clamp 19 secures the wheelhead 16 to the lower slide 18 so that the two will move together as a unit on the base 10. A second clamp 20 secures the lower slide 18 to the base 10 whereupon the wheelhead 16 may be traversed along the lower slide 18 by releasing the clamp 19.

The structure of the foregoing centerless grinding machine is more particularly shown and described in U.S. Pat. No. 2,889,665 to Jessup, et al. The details of the operation of the centerless grinding machine are described in the aforesaid Jessup, et al. patent.

The grinding wheel 11 is supported on one end of a spindle 21, which is rotatably supported within the base 10 by bearings 22 and 23 such as shoe bearings, for example, in the manner more particularly shown and described in U.S. Pat. No. 2,507,558 to Dall, et al. The bearings 22 and 23 support longitudinally spaced portions of the spindle 21.

As shown in FIG. 2, the grinding wheel 11 utilizes balls 24 to balance the grinding wheel 11. The dynamic balance mechanism, which utilizes the balls 24, is more particularly shown and described in the aforesaid Dall, et al. patent. While the balls 24 balance the grinding wheel 11, there is still a vibration produced in the spindle 21 because of bending of the spindle 21 due to the engagement of the grinding wheel 11 with the workpiece 12. This engagement creates a displacement of the grinding wheel 11 that is transmitted to the spindle 21 whereby the spindle 21 vibrates.

To increase the minimum dynamic stiffness of the spindle 21 whereby the amplitude of its vibration can be reduced so that regenerative chatter is eliminated, the spindle 21 has a sleeve 25 of a viscoelastic material bonded thereto for a substantial portion of its length between the bearings 22 and 23. The sleeve 25 of the viscoelastic material, which may be polyvinyl chloride, for example, is disposed in surrounding relation to the spindle 21 to absorb the vibrations of the spindle 21. The sleeve 25 absorbs the vibrations due to compression, tension, and shear strains created in the viscoelastic material by the vibrations of the spindle 21. The length of the sleeve 25 is as long as possible to surround as much of the length of the spindle 21 between the bearings 22 and 23 as possible to increase the absorption of vibrations of the spindle 21 by the viscoelastic material. As the length of the sleeve 25 is increased, the dynamic stiffness of the spindle 21 increases whereby the amplitude of vibration of the spindle 21 is decreased.

The sleeve 25 of viscoelastic material has a sleeve 26, which is preferably formed of metal but may be formed of any suitable material, including a plastic, that will constrain the sleeve 25 when the spindle 21 vibrates, in surrounding relation thereto and bonded thereto. The sleeve 26 is employed to constrain the sleeve 25 so as to increase the shear strains in the viscoelastic material of the sleeve 25 whereby the damping, which is produced by the sleeve 25 of viscoelastic material, is increased. This allows the viscoelastic material to absorb more energy to increase the minimum dynamic stiffness of the spindle 21.

Referring to FIGS. 3 to 6, there is shown an apparatus for forming the sleeve 25 of viscoelastic material between the spindle 21 and the constraining sleeve 26. The apparatus includes fixtures 27 and 28 disposed in surrounding relation to the spindle 21 and the sleeve 26.

The sleeve 26 has its lower end supported in the lower fixture 28, which comprises a pair of semicircular members 29 and 30 (see FIG. 6) secured to each other by bolts 31. The sleeve 26 rests on bottom surface 32 of a recess 33, which is formed in both the members 29 and 30 of the lower fixture 28. By disposing the sleeve 26 within the recess 33, the sleeve 26 is spaced from the spindle 21 a uniform distance.

The upper fixture 27 includes a pair of semicircular upper members 34 and 35 (see FIG. 5), which are secured to each other by bolts 36, and a lower annular member 37, which is supported by the upper end of the sleeve 26. The member 37 supports the members 34 and 35 by having a reduced upper annular portion 38 (see FIG. 4) receiving the lower ends of the members 34 and 35.

The upper members 34 and 35 of the fixture 27 have passages 39 and 40, respectively, extending therethrough. The passages 39 and 40 allow a liquid thermosetting resin, which forms the viscoelastic material of the sleeve 25, to be supplied to the longitudinal annular area, which has the same thickness throughout, between the sleeve 26 and the spindle 21 to form the sleeve 25. After the resin has been supplied through the passages 39 and 40 to the area between the sleeve 26 and the spindle 21, is cures therein to form the sleeve 25 bonded to each of the spindle 21 and the sleeve 26. Suitable examples of the thermosetting material are polyvinyl chloride and epoxies.

After the resin has cured, the fixtures 27 and 28 are removed therefrom. The semicircular members 34 and 35 of the upper fixture 27 are separated through removing the bolts 36 therefrom. Then, the lower annular member 37 of the upper fixture 27 is lifted over the upper reduced end of the spindle 21. The fixture 28 is then removed through disconnecting the members 29 and 30 from each other by withdrawing the bolts 31.

The thickness of the sleeve 25 is determined by the size of the recess 33 in the lower fixture 28. Of course, the upper fixture 27 must have the lower annular member 37 formed with a recess 41 of the same diameter as the recess 33 to insure the uniform thickness of the sleeve 25 throughout its length. An increase in the thickness of the sleeve 25 increases its damping capability to a predetermined thickness depending upon the viscoelastic material of the sleeve 25.

While the present invention has shown and described the sleeve 26 as surrounding the sleeve 25, it should be understood that the minimum dynamic stiffness of the spindle 21 can be increased even if the sleeve 26 is omitted. Furthermore, the sleeve 26 does not have to extend for the length of the sleeve 25. Additionally, neither the sleeve 25 has to completely surround the spindle 21 nor the sleeve 26 completely surround the sleeve 25. In any of the foregoing situations, the minimum dynamic stiffness of the spindle 21 is not increased to the same extent so that maximum effective damping is not obtained. However, any of the foregoing alterations still increases the minimum dynamic stiffness of the spindle 21 to allow an increase in the cutting stiffness without regenerative chatter occurring.

While the present invention has described the sleeve 25 of the viscoelastic material as being bonded to the spindle 21, it should be understood that such is not a requisite for the present invention. It is only necessary that the sleeve 25 not slip relative to the spindle 21. Accordingly, the spindle 21 could have a non-slipping outer surface.

Likewise, it is not necessary that the sleeve 26 be bonded to the sleeve 25. It is only necessary that the sleeve 26 not slip relative to the sleeve 25.

While the damping means of the present invention has been shown and described as used with a grinding wheel having an automatic wheel balancer, it should be understood that it is not necessary for the grinding wheel to have an automatic wheel balancer. Furthermore, the present invention has utility in other than grinders so that it may be used with milling machines, lathes, or boring machines, for example. The invention has utility wherever there is bending of a spindle or rotating shaft and it is desired to reduce the amplitude of the vibration of the spindle or the rotating shaft due to the bending; thus, it is not limited to machine tools.

The present invention has utility with a non-rotating shaft or support member having a cutting element supported thereon such as a boring bar of the previously mentioned boring machines. It is only necessary that there be vibrations in the support member or shaft for the non-tuned damping means of the present invention to have utility.

It should be understood that it is not necessary for the support member or shaft to have a circular cross section. Furthermore, it is not a requisite of the present invention that the cross section be constant throughout the length of the support member or shaft. Additionally, the damping means does not have to be disposed between bearing means for the damping means to absorb the vibrations of a support member or shaft to increase its minimum dynamic stiffness.

While the viscoelastic material of the sleeve 25 has been described as being formed from a thermosetting resin, it should be understood that such is not a requisite for satisfactory operation of the damping means of the present invention. Thus, the viscoelastic material could be butyl rubber or a silicon fluoride, for example. It would be necessary to form either the butyl rubber or the silicon fluoride in a sheet and secure it to the shaft so that it does not slide relative thereto.

An advantage of this invention is that there is no tuning required between the shaft and the damping means. Another advantage of this invention is that it does not add any significant weight to the spindle or rotating shaft. A further advantage of this invention is that it does not affect the balance of the spindle or rotating shaft.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In combination:
   a rotating shaft;
   bearing means to support longitudinally spaced portions of said rotating shaft;
   damping means disposed between said bearing means to increase the minimum dynamic stiffness of said rotating shaft;
   and said damping means including:
   a layer of viscoelastic material of substantially uniform thickness extending longitudinally along said rotating shaft in at least partial surrounding relation to said rotating shaft to be movable in response to vibrations of said rotating shaft to absorb the vibrations;
   first means to prevent relative sliding movement between said rotating shaft and said layer of viscoelastic material;
   a member disposed in at least partial surrounding relation to said layer of viscoelastic material;
   second means to prevent relative sliding movement between said layer of viscoelastic material and said member;
   and said member constraining said layer of viscoelastic material to increase the strains in said layer of viscoelastic material.

2. The combination according to claim 1 in which:
   said first preventing means includes bonding of said layer of viscoelastic material to said rotating shaft;
   and said second preventing means includes bonding of said member to said layer of viscoelastic material.

3. The combination according to claim 2 in which:
   said layer of viscoelastic material comprises a sleeve disposed in surrounding relation to said rotating shaft;
   and said member comprises a second sleeve disposed in surrounding relation to said sleeve of viscoelastic material, said second sleeve constraining said sleeve of viscoelastic material to increase the strains in said sleeve of viscoelastic material.

4. The combination according to claim 3 in which said second sleeve extends for the length of said sleeve of viscoelastic material.

5. The combination according to claim 2 in which said layer of viscoelastic material surrounds said rotating shaft.

6. The combination according to claim 5 in which said member extends for the length of said layer of viscoelastic material.

7. The combination according to claim 2 in which said member extends for the length of said layer of viscoelastic material.

8. The combination according to claim 1 in which: said layer of viscoelastic material comprises a sleeve disposed in surrounding relation to said rotating shaft; and said member comprises a second sleeve disposed in surrounding relation to said sleeve of viscoelastic material, said second sleeve constraining said sleeve of viscoelastic material to increase the strains in said sleeve of viscoelastic material.

9. The combination according to claim 8 in which said second sleeve extends for the length of said sleeve of viscoelastic material.

10. The combination according to claim 1 in which said layer of viscoelastic material surrounds said rotating shaft.

11. The combination according to claim 10 in which said member extends for the length of said layer of viscoelastic material.

12. The combination according to claim 1 in which said member extends for the length of said layer of viscoelastic material.

* * * * *